United States Patent [19]

Kuster

[11] 4,046,107
[45] Sept. 6, 1977

[54] LAYING CAGE SUBFLOOR

[76] Inventor: Herman A. Kuster, 916 Edon Road, Camden, Mich. 48232

[21] Appl. No.: 705,287

[22] Filed: July 14, 1976

[51] Int. Cl.² .............................................. A01K 31/16
[52] U.S. Cl. ........................................ 119/17; 119/48
[58] Field of Search .................. 119/17, 19, 22, 28, 119/48, 45, 18

[56] References Cited

U.S. PATENT DOCUMENTS 3,029,789   4/1962   Fisher ................................... 119/48

FOREIGN PATENT DOCUMENTS 214,914   5/1958   Australia ................................ 111/17

*Primary Examiner*—Hugh R. Chamblee
*Attorney, Agent, or Firm*—Beaman & Beaman

[57] ABSTRACT

The invention pertains to a subfloor for use in egg laying cages wherein the subfloor prevents caged fowl from catching their spurs in the conventional floor grate. The subfloor is formed of longitudinal and transverse members spaced apart a distance equal to the spacing of the corresponding elements of the cage floor. However, the subfloor is so located upon the cage floor that the resultant floor openings are only one quarter the area of the previous floor openings providing superior support for the bird's feet and preventing spurs from being caught in the cage floor. As the subfloor is loosely supported upon the cage floor, relative movement therebetween produces a self-cleaning action.

9 Claims, 4 Drawing Figures

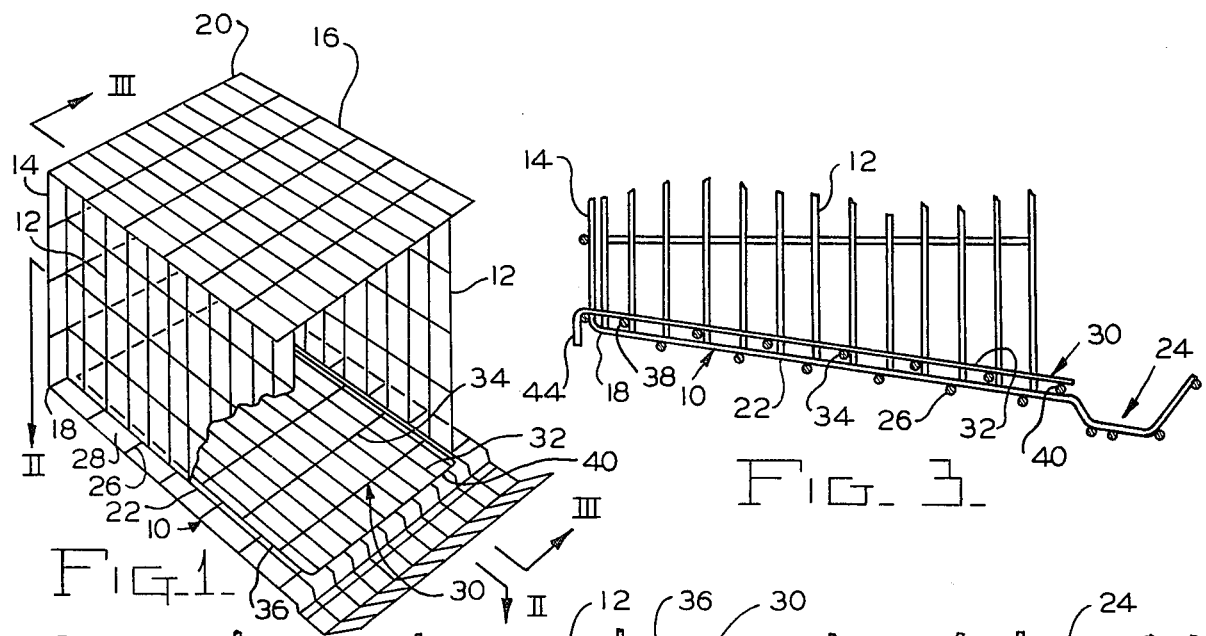
FIG. 1.
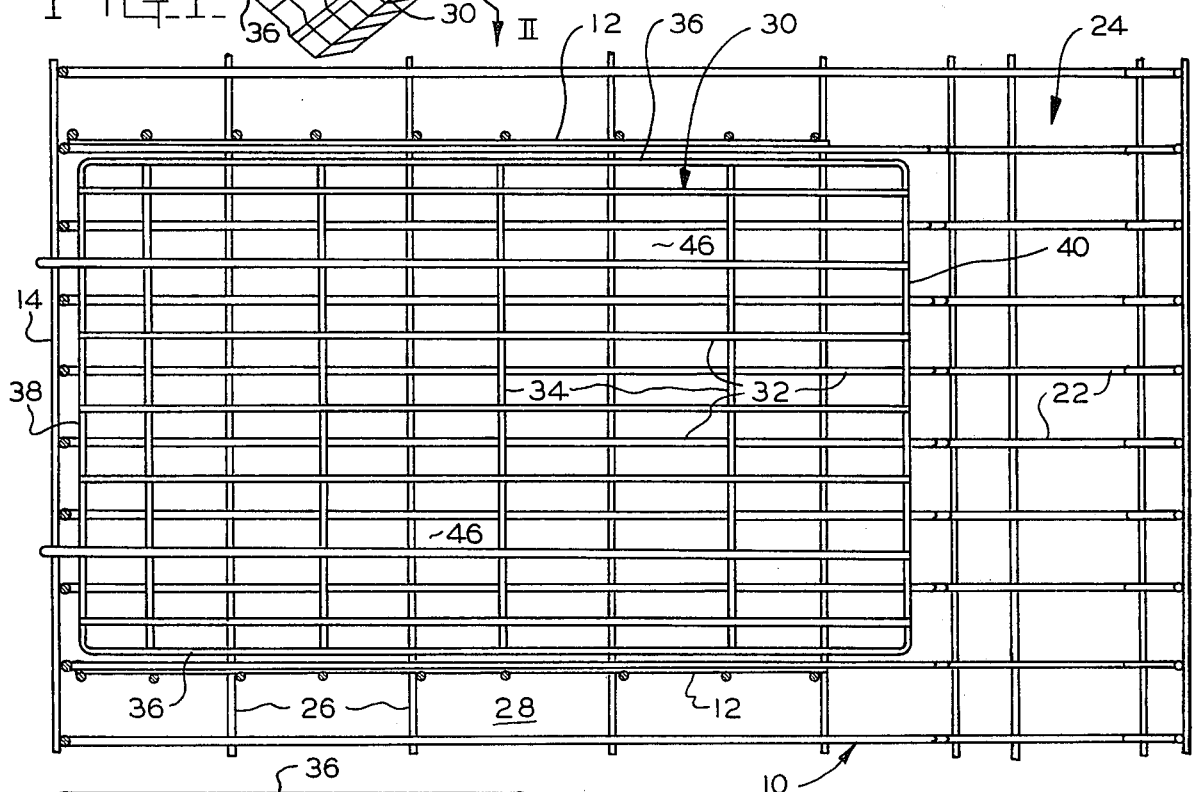
FIG. 3.
FIG. 2.
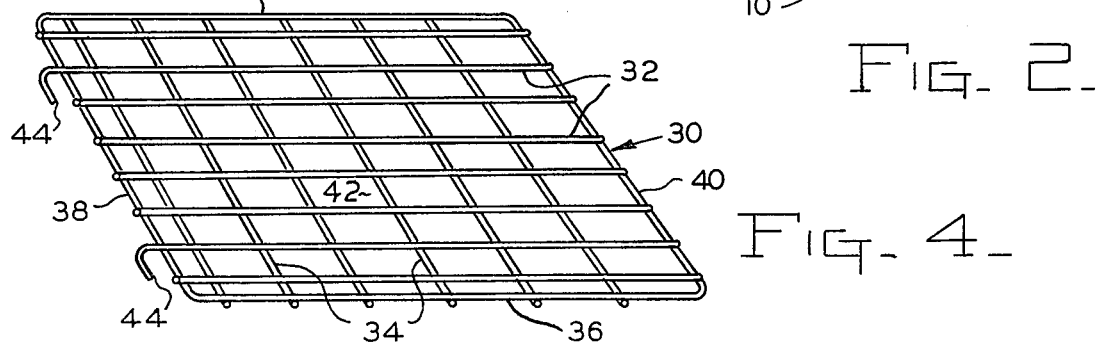
FIG. 4.

LAYING CAGE SUBFLOOR

BACKGROUND OF THE INVENTION

The invention pertains to the field of animal husbandry and, in particular, egg laying cages for chickens utilizing grate floors.

The primary egg production in this country is produced by large batteries of laying cages vertically stacked relative to each other. The cages are of such size as to accommodate three or four chickens and the cage floors consist of an open grate through which the droppings pass, inclined to the horizontal whereby the eggs laid roll from the enclosure defined by the cage to an accessible portion of the floor. Such egg producing batteries may house between 10,000 and 50,000 hens.

As the laying cages are formed of welded wire, the weight of the chickens is supported upon the welded wire floor grate and the openings defined in the floor grate must be sufficient to permit the droppings to readily pass therethrough. It is common practice to now raise laying hens on wire grates from infancy and hens raised upon wire have a tendency to develop a foot formation wherein the toes bend and extend downwardly, often passing through the floor grate. Hens raised on the ground tend to develop feet which are substantially planar and the toes do not extend downwardly through a wire floor grate to the extent of hens raised from infancy on wire grates. As the hens' toes extend through the floor grate, occasionally the entire foot will extend through the grate opening and the spur, or other portion of the foot, will become caught in the floor grate. Such occurrence results in considerable excitement and commotion and the movement of the other hens in the cage often results in the death of the caught hen. Thus, it is not unusual for up to 10% of caged hens to die from such occurrences.

The floor grates of fowl cages have been the subject of a number of improvements and attention is directed to U.S. Pat. Nos. 2,766,723; 3,029,789; 3,757,741; 3,726,255 and 3,760,769.

Those improvements which have previously taken place have not overcome the two most important requirements for a laying cage subfloor. Namely, the floor must adequately support the hens to prevent their feet and spurs from being caught in the floor grate but the grate must be open enough to permit the droppings to readily pass therethrough. Grates of close mesh prevent the chickens' feet from being caught but such close mesh floor grates permit the droppings to catch and build up, causing serious sanitation problems resulting in dirty eggs and disease.

SUMMARY OF THE INVENTION

It is an object of the invention to provide a laying cage having a subfloor which provides excellent support of the laying hens, preventing their feet and spurs from being caught therein, yet permits the droppings to readily pass therethrough.

Another object of the invention is to provide a laying cage with a subfloor wherein the laying cage subfloor is inclined to the horizontal, accurately supports the hens without catching spurs and toes, permits eggs to readily roll across the floor to the collecting portion of the floor, and is self-cleaning.

In the practice of the invention a subfloor is placed upon the conventional laying cage floor. The laying cage floor is formed of a grate defined by parallel spaced longitudinal elements welded to parallel spaced transverse elements. The subfloor consists of longitudinal mwmbers welded to transverse members, and the spacing between the parallel longitudinal members is equal to the space between the longitudinal floor elements. Likewise, the spacing between the parallel transverse members is equal to the spacing between the floor transverse elements.

The subfloor is supported upon the cage floor in such a manner that in plan projection, the subfloor longitudinal members are an equal distance between the floor longitudinal elements and, likewise, the subfloor transverse members are equi-distant between the transverse floor elements. Thus, the resultant area of the openings through the subfloor and floor is one quarter that of the area of the openings of the cage floor prior to installation of the subfloor.

The subfloor is loosely supported upon the floor by a pair of tabs and, as the subfloor usually slightly departs from a planar configuration, the subfloor will move relative to the cage floor as the hens walk thereon. Such movement of the subfloor relative to the cage floor permits the droppings to readily work through the subfloor and floor regardless of the fact that the openings in the floor are only one quarter the area of the previous cage floor. The reduction in opening area prevents the chickens' legs from falling through the floor openings and prevents the leg spurs from being hung up on the cage or floor structure.

The lateral edges of the subfloor are defined by longitudinally extending edge members spaced from the adjacent longitudinal members approximately one-half the usual spacing between longitudinal members. As the sidewalls of the cages are usually attached adjacent floor longitudinal elements, this spacing of the subfloor lateral edge members assures proper orientation of the subfloor longitudinal members to the floor elements. Also, the tabs mounting the subfloor on the cage floor are so related to the subfloor transverse members that the transverse members are equidistantly located from the floor transverse elements. In a cage wherein the end wall extends upwardly from the floor grate by bending longitudinal elements at a transverse element the subfloor end edge at which the locating tabs are located will be spaced from the adjacent transverse member one-half the distance separating the subfloor adjacent transverse members.

BRIEF DESCRIPTION OF THE DRAWINGS

The aforemention objects and advantages of the invention will be appreciated from the following description and accompanying drawings, wherein:

FIG. 1 is a perspective view of a laying cage having a subfloor in accord with the inventive concept, a portion of the sidewall, and the front end wall, are deleted for purpose of illustration, FIG. 2 is a plan view of a laying cage utilizing a subfloor in accord with the invention, as taken along section II—II of FIG. 1, FIG. 3 is a detail elevational sectional view as taken along section III—III of FIG. 1, and FIG. 4 is a perspective view of the laying cage subfloor prior to installation.

DESCRIPTION OF THE PREFERRED EMBODIMENT

A typical laying cage in which the subfloor of the invention is employed is shown in FIG. 1. For purpose of illustration only a single laying cage is illustrated, but it will be understood that such cages are commonly utilized in batteries, several cages high and horizontally staggered, and the cage itself is of a conventional construction. The cage consists of a floor grate 10, sidewalls 12, a rear end wall 14, and a top or cover 16. The front wall is not shown in FIG. 1, for clarification of illustration, but is employed to enclose the front of the cage whereby a complete enclosure is defined of sufficient dimension to house three or four laying hens.

The floor, sidewalls, end walls and top are formed of welded wire and the floor 10, rear end wall 14, and top 16, may be formed from a single section of grate bent at substantially right angles at 18 and 20, FIG. 1. The side walls 12 may be attached, as by welding, at their lower regions to the floor longitudinal elements and the top longitudinal elements, or clips, or bent wires may be used for this assembly purpose.

The floor 10 consists of a plurality of longitudinal elements 22 parallel to each other and evenly spaced throughout the width of the floor. As apparent in FIG. 3, the floor is inclined to the horizontal whereby the floor portion adjacent the rear wall 14 is higher than the egg-receiving and collection portion 24. The portion 24 extends exteriorly from the confines of the cage and the front end wall, not shown, is provided with a lower opening whereby eggs laid upon the floor may roll from the cage enclosure to the portion 24.

In order to facilitate egg movement upon the floor 10 the transverse elements 26 to which the longitudinal elements 22 are welded, are located below the longitudinal elements whereby the eggs will be supported upon the elements 22 and the egg movement toward the portion 24 is unimpeded by the transverse elements.

The spacing between the adjacent transverse elements 26 is greater than the spacing between adjacent longitudinal elements 22 and the floor grate 10 consists of a plurality of rectangular openings 28 through which the bird droppings may pass. In a conventional commercial embodiment, the transverse elements 26 are spaced approximately 2 inches from each other, while the longitudinal elements 22 are separated by approximately 1 inch. This spacing is such that chickens within the cage enclosure walking upon the floor grate are capable of entangling their toes and spurs with the floor grate and, as described above, such entangling may result in the trampling and death of the chicken.

The subfloor 30 in accord with the invention consists of a wire grate of the configuration shown in FIG. 4. The subfloor grate consists of a plurality of longitudinal members 32 welded to a plurality of transverse members 34. The members 32 are parallel with each other and the members 34 are also parallel with each and perpendicular to the longitudinal members. The periphery of the subfloor may be defined by a frame consisting of lateral edge members 36, a rear edge member 38 and a front edge member 40.

The spacing between the longitudinal members 32 corresponds to the spacing between the floor grate elements 22 and, likewise, the spacing between the subfloor transverse members 34 corresponds to the spacing between floor elements 26 wherein rectangular openings 42 are defined in the subfloor grate of a dimension equal to that defined in the cage floor grate.

The width of the subfloor 30 is substantially equal to the distance separating the sidewalls 12 and the longitudinal members 32 adjacent the edge members 32. Also, the rear edge member 38 is spaced from its adjacent transverse member 34 by a distance substantially one-half the distance separating adjacent transverse members. Attachment means in the form of a pair of tabs constituting extensions of members 32 are defined upon the subfloor adjacent the rear edge member 38. The tabs 44 are bent downwardly, FIGS. 3 and 4, over the member 38.

The aforementioned construction of the subfloor permits the subfloor 30 to be placed within the cage enclosure directly upon the floor grate 10 between the sidewalls 12 and the tabs 44 will be disposed over a transversed member substantially within the plane of the rear wall 14. Due to the half spacing of the edge members 36 and the end edge member 38, the members 32 will be equidistantly spaced from the floor longitudinal elements 22, FIG. 2, and the transverse members 24 will be equidistantly spaced between the floor transverse elements 26. This relationship of the subfloor to the cage floor results in openings 46 of plan projection, one-fourth in area to the opening area of the original cage floor and subfloor openings. Thus, the reduced dimension of the openings upon which the hens are walking eliminates the possibility of the hens' toes and spurs passing through the floor and becoming entangled in the subfloor or floor.

While the use of the subfloor 30 significantly reduces the dimension of the openings through which the bird droppings pass, the fact that the subfloor is merely resting upon the cage floor permits relative movement between the subfloor and cage floor which "works" the droppings through the reduced dimension openings 46 and, thus, the subfloor is self-cleaning. The tabs 44 will prevent the subfloor from moving downwardly on the cage floor but will not restrict the subfloor from the limited vertical movement that occurs due to the shifting of the hens' weight on the subfloor as the hens walk about the cage.

As the subfloor longitudinal members 32 extend in the direction of egg movement, the subfloor in no way impedes the movement of the eggs to the collecting portion 24 and, as the subfloor terminates short of the portion 24, FIG. 3, the subfloor causes no problems in egg movement or collection.

It will be noted from FIG. 3 that the subfloor transverse members 34 will rest upon the floor longitudinal elements 22 and during the course of manufacture the subfloor 30 will not be absolutely co-planar in comparison to the cage floor 10 and, thus, the aforementioned relative movement between the subfloor and cage floor will occur.

The subfloor 30 may be easily inserted into existing cages merely by inserting the subfloor therein to place the tabs 44 over an element 26 and the weight of the subfloor will hold it in place prior to the chickens being placed in the cage. If it is desired to insert the subfloor into the cage when occupied by chickens, a smooth sheet material may be placed upon the upper surface of the subfloor and the subfloor raised slightly from the cage floor and slipped under the chickens' feet, which slide upon the sheet. Once the subfloor is installed as desired the sheet may be removed permitting the hens to directly engage the subfloor.

The use of the invention has substantially reduced the loss of laying hens from causes relating to the hens' legs and spurs being caught in the cage floor, and it is understood that various modifications to the inventive concept may be apparent to those skilled in the art without departing from the spirit and scope of the invention.

I claim:

1. A laying cage for fowl comprising, in combination, an enclosure defined by side walls, end walls and a floor, said floor consisting of an open grate defined by a plurality of longitudinal elements affixed to a plurality of transverse elements, said longitudinal elements being transversely spaced from each other and direction of said longitudinal elements whereby said elements define openings therebetween permitting droppings to readily pass therethrough, a subfloor directly supported upon said floor, said subfloor comprising a plurality of longitudinal members affixed to a plurality of transverse members, said longitudinal members being transversely spaced from each other a distance substantially equal to the spacing between said longitudinal elements and said transverse members being spaced from each other a distance substantially equal to the spacing between said transverse elements, and means locating said subfloor upon said floor whereby said longitudinal members are disposed above and substantially equidistant between adjacent longitudinal elements and said transverse members are disposed above and substantially equidistant between adjacent transverse elements.

2. In a laying cage as in claim 1 wherein said subfloor is loosely supported upon said floor whereby limited movement between said floor and subfloor occurs.

3. In a laying cage as in claim 2, said floor and subfloor being inclined to the vertical and each including an upper portion and a lower portion, said floor lower portion extending exteriorly of the enclosure defined by said walls, said longitudinal members extending between said floor upper and lower portions, said means locating said subfloor upon said floor including means defined on said subfloor at said upper portion thereof attaching said subfloor to said floor upper portion.

4. In a laying cage as in claim 3 wherein said attachment means comprises a pair of tabs defined on said subfloor upper portion engaging the upper portion of said floor.

5. In a laying cage as in claim 1 wherein said means locating said subfloor upon said floor includes edge members defining lateral edges of said subfloor parallel to said longitudinal members engageable with said side walls, said edge members being spaced from their adjacent longitudinal member substantially one-half the distance separating said longitudinal members.

6. In a laying cage as in claim 2 wherein said floor is substantially planar and said subfloor is nonplanar whereby relative movement between said floor and subfloor occurs as housed fowl move about said enclosure.

7. In a laying cage as in claim 3 wherein said longitudinal members are disposed over said transverse members.

8. A subfloor for a laying cage having a floor consisting of an open grate defined by a plurality of spaced, parallel longitudinal elements affixed to a plurality of spaced parallel transverse elements, said elements defining rectangular openings of a given area, comprising in combination, a subfloor grate defined by a plurality of spaced parallel longitudinal members affixed to a plurality of parallel spaced transverse members, adjacent longitudinal members being spaced apart a distance substantially equal to the spacing of adjacent longitudinal elements and adjacent transverse members being spaced apart a distance substantially equal to the spacing of adjacent transverse elements, attachment means defined upon said subfloor grate whereby said longitudinal members are disposed above and substantially equidistant between adjacent longitudinal elements and said transverse members are disposed above and substantially equidistant between adjacent transverse elements, and elongated edge members affixed to said transverse member parallel to said longitudinal members defining the lateral edges of said subfloor grate, said lateral edge members being spaced from the adjacent longitudinal member a distance substantially one-half the distance separating adjacent longitudinal members.

9. In a subfloor for laying cages as in claim 8 wherein said attachment means comprises tabs formed by extensions of at least two of said longitudinal members.

* * * * *

UNITED STATES PATENT OFFICE
CERTIFICATE OF CORRECTION

Patent No. 4,046,107      Dated September 6, 1977

Inventor(s) Herman A. Kuster

It is certified that error appears in the above-identified patent and that said Letters Patent are hereby corrected as shown below:

Column 5, line 7, before "direction" insert — said transverse elements being spaced from each other in the —

Signed and Sealed this

Twenty-second Day of November 1977

[SEAL]

Attest:

RUTH C. MASON  
Attesting Officer

LUTRELLE F. PARKER  
Acting Commissioner of Patents and Trademarks